US012681727B1

(12) United States Patent
Karp

(10) Patent No.: US 12,681,727 B1
(45) Date of Patent: Jul. 14, 2026

(54) SCALABLE HARDWARE FIFO

(71) Applicant: Amazon Technologies, Inc., Seattle, WA (US)

(72) Inventor: Roi Karp, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 18/893,649

(22) Filed: Sep. 23, 2024

(51) Int. Cl.
  *G06F 9/30* (2018.01)
  *G06F 13/28* (2006.01)
(52) U.S. Cl.
  CPC ...... *G06F 9/30043* (2013.01); *G06F 9/30098* (2013.01); *G06F 13/287* (2013.01)
(58) Field of Classification Search
  CPC .................................. G06T 1/60; G06T 1/20
  See application file for complete search history.

(56) References Cited

U.S. PATENT DOCUMENTS 10,146,434 B1 * 12/2018 Bromberg ............. G06F 3/0656
11,159,148 B1 * 10/2021 Moheban ................. G06F 5/06

2009/0019193 A1 * 1/2009 Luk ........................... G06F 5/06
                                                              710/52
2012/0030544 A1 * 2/2012 Fisher-Jeffes ....... H03M 13/395
                                                              714/E11.002
2018/0182059 A1 * 6/2018 Achiwa ................. H04N 1/0083
2018/0267924 A1 * 9/2018 Pagare ................ G06F 13/4068
2021/0223815 A1 * 7/2021 Foo ..................... G06F 12/0215

* cited by examiner

*Primary Examiner* — Getente A Yimer
(74) *Attorney, Agent, or Firm* — Weaver Austin Villeneuve & Sampson LLP

(57) ABSTRACT

A first-in-first-out (FIFO) device includes a plurality of FIFO stages coupled in series. Each FIFO stage includes a data register representing a FIFO entry, a valid register storing a data valid signal to provide a valid signal to indicate whether the FIFO entry is storing valid data, and an input multiplexer to provide data to a FIFO stage. Upon receiving a push signal to store input data into the FIFO device, a FIFO stage of the FIFO device determines whether to update the data register of the FIFO stage based on respective valid signals from the FIFO stage, and neighboring FIFO stages of the FIFO stage. Upon receiving a pop signal to provide output data from the FIFO device, the FIFO stage determines whether to provide data stored in the data register of the FIFO stage or the input data of the FIFO device to the preceding FIFO stage.

19 Claims, 6 Drawing Sheets

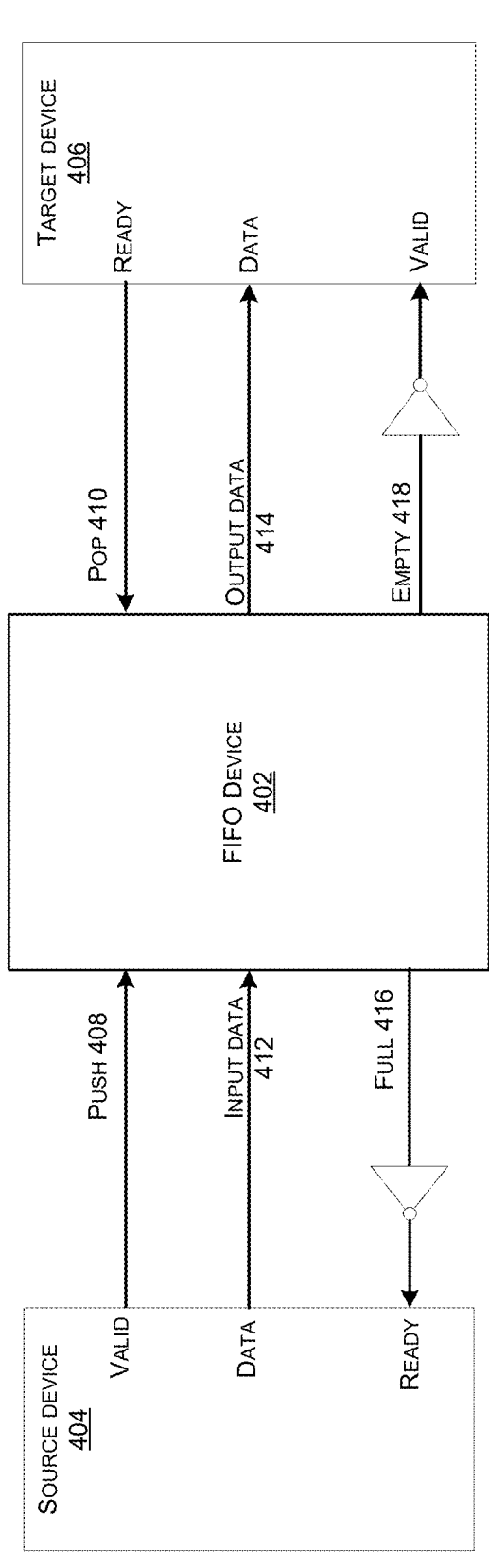
FIG. 4

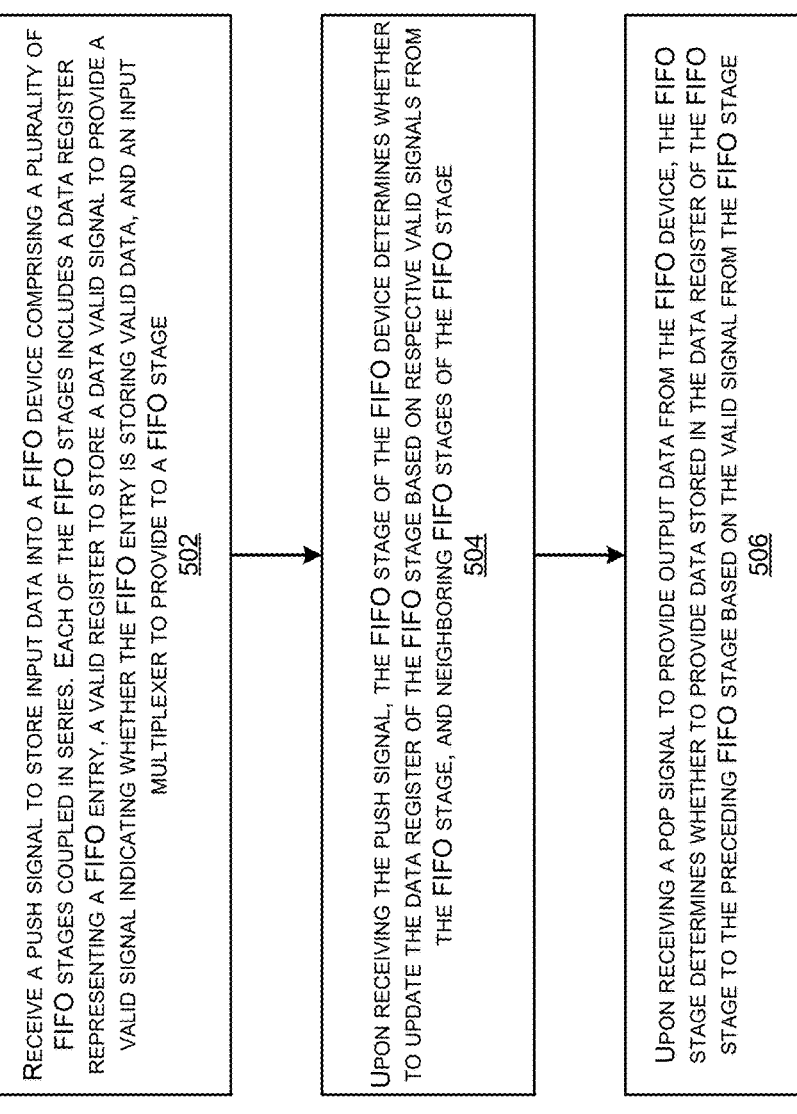

500

RECEIVE A PUSH SIGNAL TO STORE INPUT DATA INTO A FIFO DEVICE COMPRISING A PLURALITY OF FIFO STAGES COUPLED IN SERIES. EACH OF THE FIFO STAGES INCLUDES A DATA REGISTER REPRESENTING A FIFO ENTRY, A VALID REGISTER TO STORE A DATA VALID SIGNAL TO PROVIDE A VALID SIGNAL INDICATING WHETHER THE FIFO ENTRY IS STORING VALID DATA, AND AN INPUT MULTIPLEXER TO PROVIDE TO A FIFO STAGE
502

UPON RECEIVING THE PUSH SIGNAL, THE FIFO STAGE OF THE FIFO DEVICE DETERMINES WHETHER TO UPDATE THE DATA REGISTER OF THE FIFO STAGE BASED ON RESPECTIVE VALID SIGNALS FROM THE FIFO STAGE, AND NEIGHBORING FIFO STAGES OF THE FIFO STAGE
504

UPON RECEIVING A POP SIGNAL TO PROVIDE OUTPUT DATA FROM THE FIFO DEVICE, THE FIFO STAGE DETERMINES WHETHER TO PROVIDE DATA STORED IN THE DATA REGISTER OF THE FIFO STAGE TO THE PRECEDING FIFO STAGE BASED ON THE VALID SIGNAL FROM THE FIFO STAGE
506

FIG. 5

SCALABLE HARDWARE FIFO

BACKGROUND

In computing systems, first-in-first-out (FIFO) devices are commonly used to buffer data, and/or to manage the data flow for various applications that demand that the data is provided in the order it was received. FIFO devices can be implemented using registers, flip-flops, or any suitable storage type. In most flip-flop-based implementations, a de-multiplexer circuit is used at the input of the FIFO entries, and a multiplexer circuit is used at the output of the FIFO entries to control the input and output data flow of the FIFO device. The size of these de-multiplexer and multiplexer circuits is logarithmically proportional to the number of entries or the depth of the FIFO device. Thus, having a large number of FIFO entries can significantly increase the size of the de-multiplexer and multiplexer circuits to impact the latency and layout area of the FIFO device.

BRIEF DESCRIPTION OF THE DRAWINGS

Various embodiments in accordance with the present disclosure will be described with reference to the drawings, in which:

FIG. 4 illustrates an example of a system comprising a FIFO device having a bounded gate count for each FIFO stage, in accordance with some embodiments;

FIG. 5 illustrates an example of a flow chart for a method performed by a FIFO stage of the FIFO device, in accordance with some embodiments.

DETAILED DESCRIPTION

Figure 1:
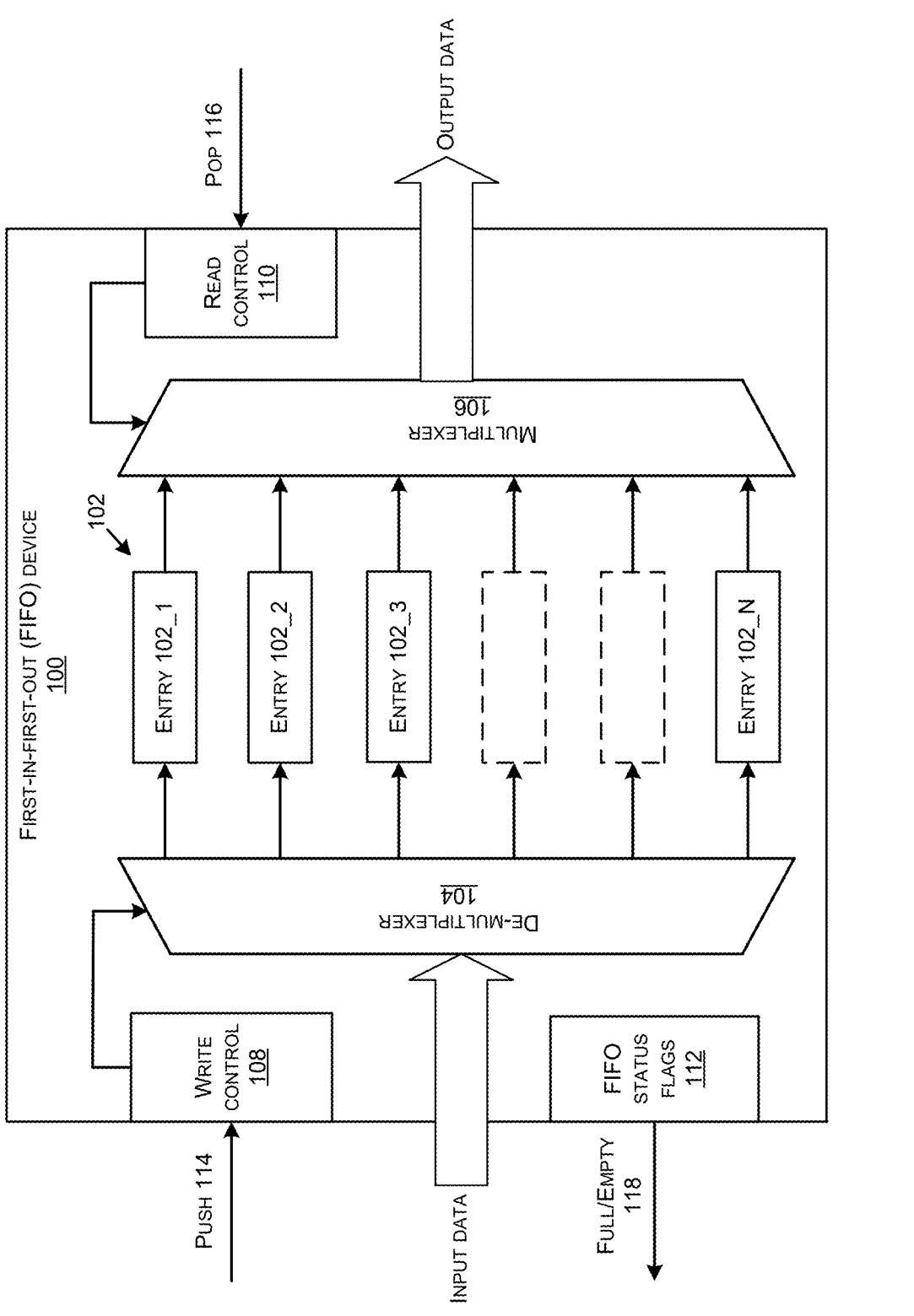
FIG. 1 illustrates a first-in-first-out (FIFO) device that uses a de-multiplexer and a multiplexer to control data flow through the FIFO device.

In computing systems, first-in-first-out (FIFO) devices are generally used for buffering the data, and/or to manage the flow of data between different entities of the computing device. For example, when a source device is ready to send data to a target device, but the target device is not ready to receive the data (e.g., due to being busy with another task), a FIFO device between the source and target devices can be used to avoid stalling the source device. In such cases, the FIFO device can temporarily buffer the data sent by the source device until the target device is ready to receive the data.

In most implementations, a FIFO device may include FIFO entries to store the data, write and read control circuits to write and read the FIFO entries, a de-multiplexer circuit at the input of the FIFO entries, a multiplexer circuit at the output of the FIFO entries, and status flags indicating whether the FIFO is empty or full. The FIFO entries may be implemented using flip-flops. In this specification, FIFO device and FIFO may be used interchangeably.

Generally, a de-multiplexer is used at the input of the FIFO to select one of the FIFO entries to push the data in, and the multiplexer is used at the output of the FIFO to select one of the FIFO entries to pop the data out. The de-multiplexer and multiplexer may be controlled using respective select signals to select one of the entries for pushing the data in, or for popping the data out. Thus, as the number of FIFO entries increases to allow storing more data in the FIFO, the size of the de-multiplexer and the multiplexer circuits also has to increase. Furthermore, the number of select signals may also increase to support the selection of a higher number of FIFO entries. The increase in de-multiplexer and multiplexer gate count and select signals not only impacts the performance and layout area but can also make routing the physical design challenging.

Techniques described herein provide a FIFO device formed by coupling FIFO stages that scale proportionally with the FIFO depth without having to scale any de-multiplexer or multiplexer. In some embodiments, the FIFO device may include a plurality of FIFO stages coupled in series, and each FIFO stage may include a data register representing a FIFO entry. When a push signal to store an input data into the FIFO device is asserted, the data may be stored in a data register of a FIFO stage based on whether the given FIFO stage, and the preceding and/or subsequent FIFO stage(s) are storing valid data. When the pop signal to read the FIFO device is asserted, the output data of the FIFO device can be driven directly by the first FIFO stage. Thus, the need for having a de-multiplexer at the input of the FIFO, and a multiplexer at the output of the FIFO that are proportional to the FIFO depth is eliminated.

In some embodiments, each FIFO stage may also include a valid register and a control circuit. The valid register may store a data valid signal generated by the control circuit to provide a valid signal indicating whether a corresponding data register is storing valid data. The control circuit may also generate a load signal to control the loading of the data into the data register. Each FIFO stage that has a subsequent FIFO stage (e.g., the first FIFO stage to the second-to-the-last FIFO stage) may also include an input multiplexer to select between a data input of the FIFO device and the data stored in the data register of a subsequent FIFO stage to provide to the data register of the FIFO stage. Thus, generating the appropriate valid and load signals for each FIFO stage based on the status of the current and neighboring FIFO stages can simplify the logic design of the FIFO, and allow for a fixed gate count per FIFO stage irrespective of the FIFO depth. Furthermore, having a small and bounded number of gates in each FIFO stage can provide a more robust and faster design for the data flow.

The FIFO architecture described herein can also provide a valid vector that is formed from the valid signal of each FIFO stage. The valid vector has asserted bits that are stacked towards the output of the FIFO. In other words, the valid vector does not have any unasserted bits in between asserted bits. Any asserted bits are grouped together towards the output of the FIFO, and any unasserted bits are grouped together towards the input of the FIFO. This allows the valid vector to clearly represent the fill level of the FIFO at any time. Furthermore, such a valid vector also simplifies the implementation of a FIFO empty status flag because an inversion of the valid bit of the first FIFO stage (stage closest to the output) can be used as the FIFO empty status flag. Similarly, a FIFO full status flag can be implemented using the valid bit of the last FIFO stage (stage closest to the input).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a first-in-first-out (FIFO) device 100 that uses a de-multiplexer and a multiplexer to control data flow through the FIFO device 100.

The FIFO device 100 may include N number of FIFO entries 102 comprising an entry 102_1, an entry 102_2, an entry 102_3, and an entry 102_N. Each of the N FIFO entries may be implemented using a data register, flip-flop, or any suitable storage type. A de-multiplexer circuit 104 may be used at the input of the FIFO entries, and a multiplexer circuit 106 may be used at the output of the FIFO entries. A write control circuit 108 may be used to generate the write pointers based on a push signal 114. For example, the push signal 114 may be asserted by a source device that wants to send an input data for storing in the FIFO device 100. The write pointers can be used to control the select signals to the de-multiplexer 104 for storing the input data into the one of the selected FIFO entries from the N FIFO entries 102_1-102_N.

A read control circuit 110 may be used to generate the read pointers based on a pop signal 116. For example, the pop signal 116 may be asserted by a target device that wants to read an output data from the FIFO device 100. The read pointers may be used to control the select signals to the multiplexer 106 for reading the data stored in one of the selected FIFO entries from the N FIFO entries 102_1-102_N as the output data from the FIFO device 100. A FIFO status flags circuit 112 may be used to generate a full/empty flag 118 indicating whether the FIFO is full or empty. The FIFO is full when all the N entries have valid data, and the FIFO cannot accept new data to store. The FIFO is empty when not all the N entries have valid data, and the FIFO can accept new data to store. The full/empty flag 118 can be used by source and the target devices to determine when to push the new data in and when to pop data out.

Thus, the size and gate depth count of each of the de-multiplexer 104 and the multiplexer 106 has to scale to the number of FIFO entries. As the number of FIFO entries increases to support more storage capacity of the FIFO device 100, the gate depth count of each of the de-multiplexer 104 and the multiplexer 106 as well as the latency may increase. Additionally, the number of select signals going to the de-multiplexer 104 and the multiplexer 106 may also increase to support the selection of a higher number of FIFO entries. Thus, the overall gate count and the wire count of the FIFO device 100 may significantly increase for large FIFO depths, which can contribute to higher power consumption, and more routing congestion.

Figure 2:
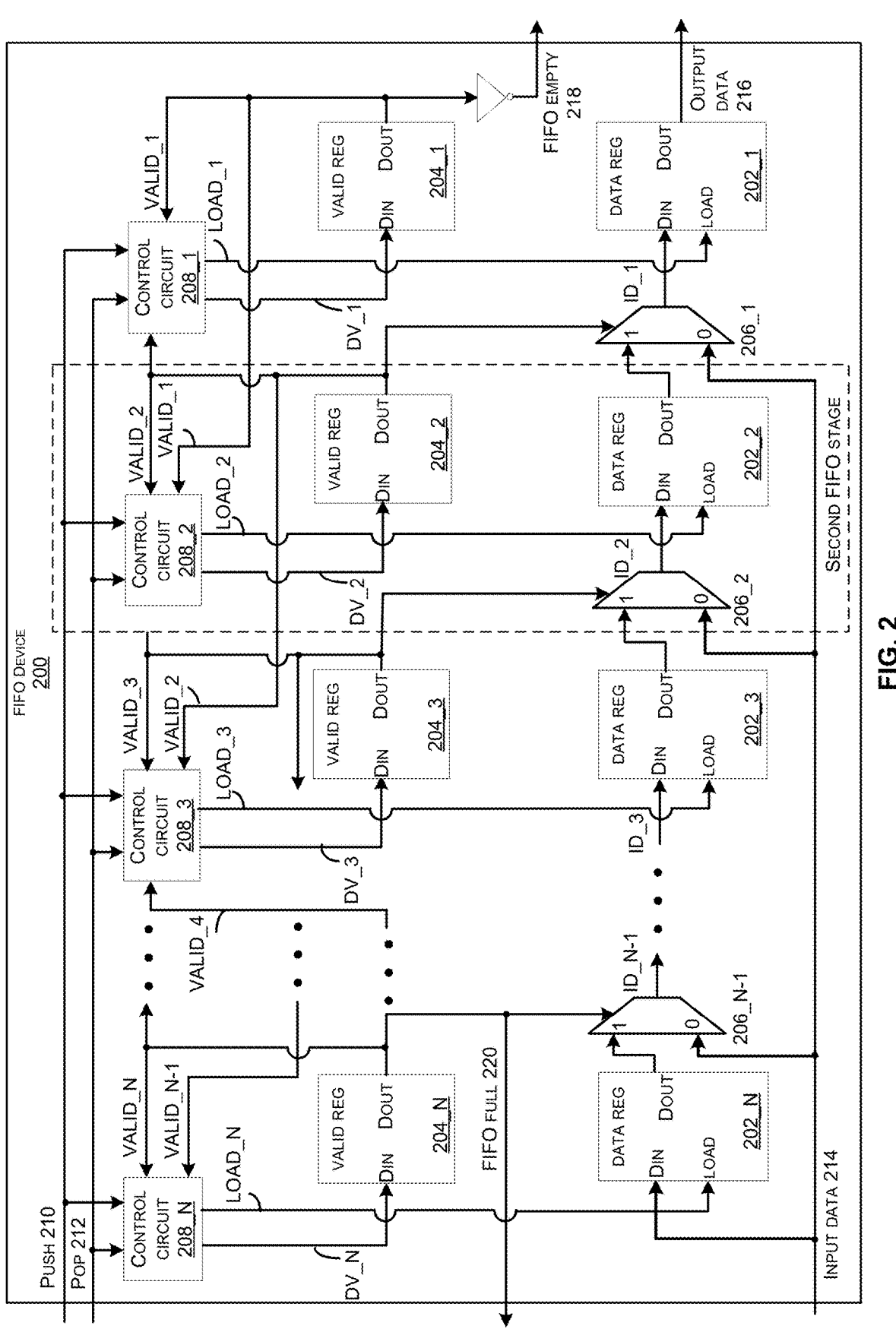
FIG. 2 illustrates an example of a FIFO device having a bounded gate count for each FIFO stage irrespective of the FIFO depth, in accordance with some embodiments.

FIG. 2 illustrates an example of a FIFO device 200 having a bounded gate count for each FIFO stage irrespective of the FIFO depth, in accordance with some embodiments. The FIFO device 200 may be used in a computing device for buffering data, and/or controlling data flow through the computing device, or for another suitable purpose. In some examples, the FIFO device 200 can be part of a system-on-a-chip (SoC) comprising one or more processors, hardware accelerators, memory devices, interconnects, microcontrollers, network controllers, among others, which can be used for various applications in networking, high performance computing, gaming, machine learning, etc.

The FIFO device 200 may receive a push signal 210 to load input data 214 into the FIFO, and a pop signal 212 to provide output data 216 from the FIFO. As an example, the input data 214 is provided by a source device to store the input data 214 in the FIFO device 200 by asserting the push signal 210. The target device may assert the pop signal 212 when it is ready to read the output data 216 from the FIFO device 200. For example, the source device may be an accelerator, and the target device may be a processor in the SoC, or vice versa.

In some embodiments, the FIFO device 200 may include a plurality of FIFO stages coupled in series. The FIFO device 200 may include N number of FIFO stages comprising a first FIFO stage, a second FIFO stage, a third FIFO stage, and an $N^{th}$ FIFO stage. N can be a positive integer representing a number of FIFO entries, or a FIFO size/depth. N can be any suitable number based on the application. For two adjacent FIFO stages, the FIFO stage that is closer to the output is referred to as a preceding FIFO stage relative to the other FIFO stage. The FIFO stage that is further away from the output is referred to as a subsequent FIFO stage relative to the other FIFO stage. By way of example, the second FIFO stage (e.g., second from the output) has been highlighted in FIG. 2 by the dotted line.

Each of the N FIFO stages may include a corresponding data register (or reg) representing a FIFO entry, a valid register (or reg), and a control circuit. The first FIFO stage may include a data reg 202_1, a valid reg 204_1, and a control circuit 208_1. Similarly, the second FIFO stage may include a data reg 202_2, a valid reg 204_2, and a control circuit 208_2, the third FIFO stage may include a data reg 202_3, a valid reg 204_3, and a control circuit 208_3, and the $N^{th}$ FIFO stage may include a data reg 202_N, a valid reg 204_N, and a control circuit 208_N.

Each of the valid registers 204_1, 204_2, 204_3, . . . , 204_N may be operable to store a data valid (DV) signal to provide a valid signal indicating whether the data register of a corresponding FIFO stage is storing valid data. As shown in FIG. 2, the valid reg 204_1 may store a DV_1 signal to provide a VALID_1 signal indicating whether the data reg 202_1 is storing valid data. The valid reg 204_2 may store a DV_2 signal to provide a VALID_2 signal indicating whether the data reg 202_2 is storing valid data. The valid reg 204_3 may store a DV_3 signal to provide a VALID_3 signal indicating whether the data reg 202_3 is storing valid data. The valid reg 204_N may store a DV_N signal to provide a VALID_N signal indicating whether the data reg 202_N is storing valid data.

Each of the control circuits 208_1, 208_2, 208_3, . . . , and 208_N may be operable to generate a DV signal for a corresponding FIFO stage, and a LOAD signal to control data loading into the data register of the corresponding FIFO stage. For example, the control circuit 208_1 may generate the DV_1 signal that may be stored in the valid reg 204_1, and a LOAD_1 signal to control the data loading into the data reg 202_1. The control circuit 208_2 may generate the DV_2 signal that may be stored in the valid reg 204_2, and a LOAD_2 signal to control the data loading into the data reg 202_2. The control circuit 208_3 may generate the DV_3 signal that may be stored in the valid reg 204_3, and a LOAD_3 signal to control the data loading into the data reg 202_3. The control circuit 208_N may generate the DV_N signal that may be stored in the valid reg 204_N, and a LOAD_N signal to control the data loading into the data reg 202_N.

The FIFO device 200 may also include an input multiplexer for each FIFO stage that has a subsequent FIFO stage. The input multiplexer may be used to select between the input data 214 of the FIFO device 200 and the data stored in the data register of the subsequent FIFO stage to provide to the data register of the FIFO stage based on a valid signal of the subsequent FIFO stage. For example, as shown in FIG. 2, an input multiplexer 206_1 may be used for the first FIFO stage since it has a subsequent second FIFO stage. The input multiplexer 206_1 may select between the input data 214 and the data stored in the data reg 202_2 of the subsequent FIFO stage to provide intermediate data ID_1 to the data reg 202_1 based on the VALID_2 signal of the subsequent second FIFO stage. For example, the input multiplexer 206_1 selects the data stored in the data reg 202_2 as ID_1 to provide to the data reg 202_1 when the VALID_2 signal is asserted (e.g., set to 1) indicating that the data reg 202_2 is storing valid data.

Additionally, as shown in FIG. 2, the second FIFO stage may include an input multiplexer 206_2 since the second FIFO stage has a subsequent third FIFO stage. The input multiplexer 206_2 may select between the input data 214 and the data stored in the data reg 202_3 to provide intermediate data ID_2 to the data reg 202_2 based on the VALID_3 signal of the subsequent third FIFO stage. For example, the input multiplexer 206_2 selects the data stored in the data reg 202_3 as ID_2 to provide to the data reg 202_2 when the VALID_3 signal is asserted (e.g., set to 1) indicating that the data reg 202_3 is storing valid data.

Also, the N−1st FIFO stage (not shown in FIG. 2) may include an input multiplexer 206_N−1 since it has a subsequent $N^{th}$ FIFO stage. The input multiplexer 206_N−1 may select between the input data 214 and the data stored in the data reg 202_N to provide intermediate data ID_N−1 to a data reg 202_N−1 (not shown in FIG. 2) based on the VALID_N signal of the subsequent $N^{th}$ FIFO stage. For example, the input multiplexer 206_N−1 selects the data stored in the data reg 202_N as ID_N−1 to provide to the data reg 202_N−1 when the VALID_N signal is asserted (e.g., set to 1) indicating that the data reg 202_N is storing valid data. Note that an input multiplexer is not needed for the last FIFO stage (e.g., $N^{th}$ FIFO stage) since it does not have a subsequent FIFO stage, and only has a preceding N−1$^{st}$ FIFO stage.

In some embodiments, control circuit of each intermediate FIFO stage that has both a preceding FIFO stage and a subsequent FIFO stage may be operable to generate a corresponding load signal based on the push signal, the pop signal, and the valid signals of the intermediate FIFO stage, the preceding FIFO stage, and the subsequent FIFO stage. For the example of the FIFO device 200, the intermediate FIFO stages having a corresponding preceding stage and a subsequent FIFO stage include the second FIFO stage, third FIFO stage, . . . , and the N−1st FIFO stage. For example, for the second FIFO stage, the control circuit 208_2 may be operable to generate the LOAD_2 signal based on the push signal 210, pop signal 212, VALID_2 signal, VALID_1 signal, and the VALID_3 signal. For the third FIFO stage, the control circuit 208_3 may be operable to generate the LOAD_3 signal based on the push signal 210, pop signal 212, VALID_3 signal, VALID_2 signal, and a VALID_4 signal. It should be noted that although some embodiments of the data register are described as being controlled by a LOAD signal, other embodiments can implement the data register without a LOAD signal. In such embodiments, the control circuit can continuously update the data register with either the data stored in the data register from the previous cock cycle, or with new data (data from a subsequent FIFO stage or input data) based on similar logic as the LOAD signal.

When both the push signal 210, and the pop signal 212 are asserted, the load signal of each FIFO stage may be asserted to load data into that FIFO stage when the valid signal of the FIFO stage indicates that the valid data is stored in the FIFO stage. As an example, when both the push signal 210, and the pop signal 212 are asserted, the control circuit 208_1 may assert the LOAD_1 signal to load the intermediate data ID_1 provided by the input multiplexer 206_1 into the data reg 202_1 if the VALID_1 signal is asserted indicating that the valid data is stored in the data reg 202_1. For example, the pop signal 212 may shift the data stored in the data reg 202_1 to the output data 216, while the push signal 210 may store the selected new data ID_1 into the data reg 202_1 in the same clock cycle. Similarly, the control circuit 208_2 may assert the LOAD_2 signal to load the intermediate data ID_2 provided by the input multiplexer 206_2 into the data reg 202_2 if the VALID_2 signal is asserted indicating that the valid data is stored in the data reg 202_2.

When only the pop signal 212 is asserted, the load signal of each FIFO stage that has a subsequent FIFO stage may be asserted to load the data into the FIFO stage when the valid signal of the subsequent FIFO stage indicates that the valid data is stored in the subsequent FIFO stage. For example, when only the pop signal 212 is asserted, if the VALID_2 signal is asserted indicating that the valid data is stored in the data reg 202_2, the control circuit 208_1 may assert the LOAD_1 signal to load the output of the data reg 202_2 selected by the input multiplexer 206_1 as ID_1 into the data reg 202_1. Similarly, if the VALID_3 signal is asserted indicating that the valid data is stored in the data reg 202_3, the control circuit 208_2 may assert the LOAD_2 signal to load the output of the data reg 202_3 selected by the input multiplexer 206_2 as ID_2 into the data reg 202_2.

When the push signal 210 is asserted, but the pop signal 212 is not asserted, the load signal of each FIFO stage that has a preceding FIFO stage may be asserted to load the data into the FIFO stage when the valid signal of the FIFO stage indicates no valid data is stored in the FIFO stage, and the valid signal of the preceding FIFO stage indicates that valid data is stored in the preceding FIFO stage. For example, when only the push signal 210 is asserted, the control circuit 208_2 may assert the LOAD_2 signal if the VALID_2 signal indicates that the data reg 202_2 is not storing valid data, and the VALID_1 signal indicates that the data reg 202_1 is storing valid data. Similarly, the control circuit 208_3 may assert the LOAD_3 signal if the VALID_3 signal indicates that the data reg 202_3 is not storing valid data, and the VALID_2 signal indicates that the data reg 202_2 is storing valid data.

The control circuit for each intermediate FIFO stage having both a preceding FIFO stage and a subsequent FIFO stage may be operable to assert the input valid signal for the corresponding FIFO stage when: (1) the push signal 210 is asserted and the valid signal of the preceding FIFO stage indicates that valid data is stored in the preceding FIFO stage; or (2) when the pop signal 212 is asserted and the valid signal of the subsequent FIFO stage indicates that valid data is stored in the subsequent FIFO stage. For example, the control circuit 208_2 may assert the DV_2 signal when: (1) the push signal 210 is asserted and the VALID_1 signal is asserted indicating that valid data is stored in the first FIFO stage; or (2) when the pop signal 212 is asserted, and the VALID_3 signal is asserted indicating that valid data is stored in the third FIFO stage. It should be noted that when the valid signal of the $i^{th}$ stage is asserted, then the data valid signal of the $(i−1)^{th}$ stage is also asserted.

The control circuit for the first FIFO stage may be operable to assert a data valid signal for the first FIFO stage when: (1) the push signal 210 is asserted and a valid signal of the first FIFO stage indicates that no valid data is stored in the first FIFO stage; or (2) when a valid signal of the subsequent FIFO stage indicates that valid data is stored in the subsequent FIFO stage irrespective of the push or the pop signals. For example, the control circuit 208_1 may assert the DV_1 signal when: (1) the push signal 210 is asserted and the VALID_1 signal is de-asserted indicating that no valid data is stored in the first FIFO stage; or (2) when the VALID_2 signal is asserted indicating that the valid data is stored in the second FIFO stage. The VALID_2 signal may only be asserted when the first FIFO stage is already storing valid data, and, therefore, the VALID_1 signal may continue to be asserted irrespective of the push and pop signals.

The control circuit for the last FIFO stage having a preceding FIFO stage without a subsequent stage is operable to generate a data valid (DV) signal for a last FIFO stage when the push signal 210 is asserted, a valid signal of the last FIFO stage indicates no valid data is stored in the last FIFO stage, and a valid signal of the preceding FIFO stage indicates valid data is stored in the preceding FIFO stage. For example, the control circuit 208_N may generate the DV_N signal when the push signal 210 is asserted, the VALID_N signal is de-asserted indicating that no valid data is stored in the last FIFO stage, and the VALID_N−1 signal is asserted indicating that valid data is stored in the N−1st FIFO stage.

In some embodiments, valid signals from all the N FIFO stages may be concatenated to provide a valid vector. For example, the valid vector may include [VALID_N, VALID_N−1, . . . , VALID_3, VALID_2, VALID_1] for the FIFO with N stages or entries. As described above, asserted bits of the valid vector is stacked towards the output of the FIFO (e.g., towards the first FIFO stage), because the VALID signal of a preceding FIFO stage has to be asserted before the VALID signal of a given FIFO stage is asserted.

In some embodiments, the valid vector may be used to generate a FIFO full signal 220 and a FIFO empty signal 218. For example, the FIFO is full when the VALID_N signal of the $N^{th}$ FIFO stage is asserted. This is because having valid data in the last FIFO stage indicates that all preceding FIFO stages are also storing valid data. Hence, the valid bit corresponding to the last FIFO stage can be used as the FIFO full signal 220. Similarly, the FIFO is empty when the VALID_1 signal of the first FIFO stage is de-asserted. This is because the lack of valid data in the first FIFO stage indicates that none of the subsequent FIFO stages are storing valid data. Hence, an inversion of the valid bit corresponding to the first FIFO stage can be used as the FIFO empty signal 218.

Various FIFO fill levels can also be determined using the valid vector. For example, if a $3^{rd}$ bit from the LSB of the valid vector is asserted but the $4^{th}$ bit is de-asserted, this indicates that the FIFO device 200 is storing valid data in 3 FIFO entries. Thus, the FIFO full signal 220 and the FIFO empty signal 218 can be provided using minimal gate count based on the outputs of the valid reg 204_N and the valid reg 204_1, respectively, as compared to the FIFO device 100 described with reference to FIG. 1 that involves examining all the FIFO entries to generate the FIFO full/empty signals 118.

Figure 3:
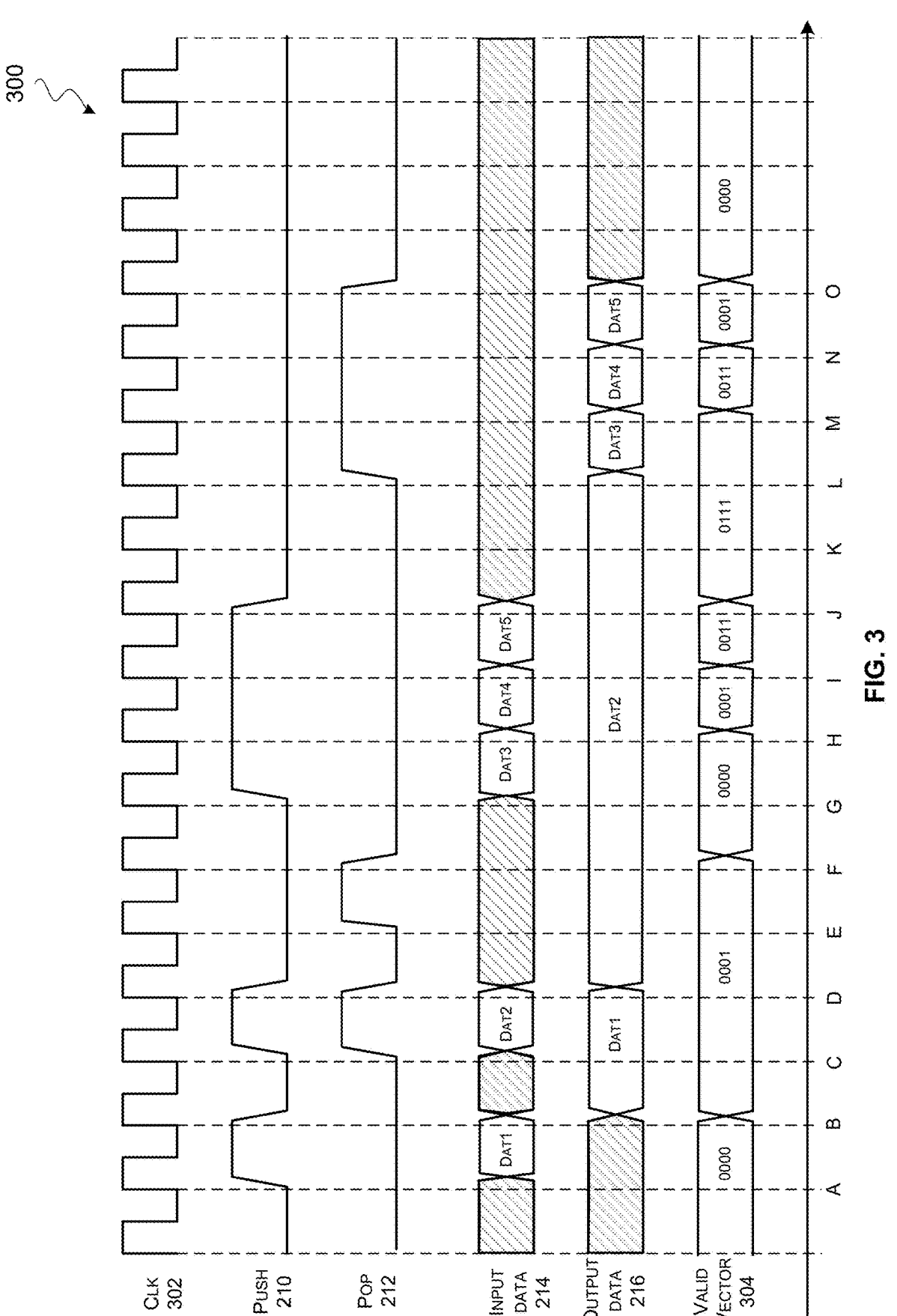
FIG. 3 illustrates an example of waveforms for different signals of the FIFO device, in accordance with some embodiments.

FIG. 3 illustrates an example of waveforms for different signals of the FIFO device 200, in accordance with some embodiments.

As an example, referring back to FIG. 2, the FIFO device 200 may include 4 FIFO stages when N is 4. Thus, the control circuit 208_N is 208_4, the valid reg 204_N is 204_4, the data reg 202_N is 202_4, and the input multiplexer 206_N−1 is 206_3. The control circuit 208_4 may receive the VALID_4 signal generated by the valid reg 204_4, the VALID_3 signal generated by the valid reg 204_3. The input multiplexer 206_3 may provide the intermediate data ID_3 to the data reg 202_3 based on the VALID_4 signal.

Referring back to FIG. 3, a clk signal 302 may represent a clock signal used by the FIFO device 200, and a valid vector 304 may represent a concatenation of the valid output signals from 4 FIFO stages of the FIFO device 200. For example, the valid vector 304 may include [VALID_4, VALID_3, VALID_2, VALID_1] signals described with reference to FIG. 2. FIG. 3 also illustrates example waveforms for the push signal 210, the pop signal 212, the input data 214, and the output data 214, described with reference to FIG. 2.

In the example shown in FIG. 3, the push signal 210 may be asserted in a cycle A of the clk 302 to store the input data 214 having a value Dat1 into the FIFO device 200. The valid vector 304 is 0000 indicating that each of the VALID_4, VALID_3, VALID_2, and VALID_1 signal is 0 or de-asserted. Thus, in this case, the FIFO is empty since none of the FIFO stages are storing valid data. The FIFO empty signal 218 may be asserted based on only the VALID_1 signal being de-asserted, as indicated by the LSB of the valid vector 304 being "0." Referring back to FIG. 2, since the VALID_1 signal is 0, the control circuit 208_1 may assert the LOAD_1 signal to load the intermediate data ID_1 provided by the input multiplexer 206_1, and the DV_1 signal to store in the valid reg 204_1. Since the VALID_2 signal is 0, the input multiplexer 206_1 may provide the value Dat1 of the input data 214 as ID_1 to the data reg 202_1 for storing.

The push signal 210 may be de-asserted in a cycle B of the clk 302. Now the VALID_1 signal is asserted (e.g., the valid vector 304 is 0001) since the data reg 202_1 is storing valid data having the value Dat1. Since the output of the data reg 202_1 is always provided as the output of the FIFO device 200, the output data 216 may include the value Dat1 as shown in FIG. 3. Note that the LSB of the valid vector 304 being "1" due to the VALID_1 signal being asserted may indicate that the FIFO is not empty, and, therefore, the FIFO empty signal 218 may be de-asserted.

Referring back to FIG. 3, the push signal 210 may be asserted again in a cycle C of the clk 302 to store the input data 214 having a value Dat2 in the FIFO device 200. Since the pop signal 212 is asserted in the same cycle as the push signal 210, the VALID_1 signal is asserted, and the VALID_2 signal is de-asserted, the control circuit 208_1 may assert the LOAD_1 signal to load the value Dat2 of the input data 214 into the data reg 202_1 provided by the input multiplexer 206_1 as ID_1. The output data 216 is the value Dat1 since the data reg 202_1 is still storing the value Dat1 in the cycle C.

In a cycle D of the clk signal 302, the push signal 210 and the pop signal 212 may both be de-asserted. The VALID_1 signal stays asserted since the data reg 202_1 is storing valid data having the value Dat2. Now, the output data 216 is the value Dat2 as shown in FIG. 3.

In a cycle E of the clk signal 302, the pop signal 212 may be asserted again. The control circuit 208_1 may de-assert the DV_1 signal when the pop signal 212 is de-asserted, since the push signal 210 and the VALID_2 signal are both de-asserted indicating that there is no new data to be stored in the data reg 202_1. However, the output data 216 may continue to be held at the value Dat2 stored in the first FIFO stage of the FIFO device 200.

In a cycle F of the clk signal 302, the pop signal 212 may be de-asserted. Since the push signal 210 is also de-asserted, the VALID_1 signal may get de-asserted. However, the output data 216 may continue to show the value Dat2 that was the last value read from the FIFO, because no new data has been shifted into the first FIFO stage.

In a cycle G of the clk signal 302, the push signal 210 may be asserted again to store the input data 214 having a value Dat3 into the FIFO device 200. Since the VALID_1 signal is de-asserted, the control circuit 208_1 may assert the DV_1 signal to store in the valid reg 204_1 to provide the VALID_1 signal, and the LOAD_1 signal to load new data in the data reg 202_1.

In a cycle H of the clk signal 302, the push signal 210 may be asserted again to store the input data 214 having a value Dat4 into the FIFO device 200. The VALID_1 signal may be asserted in this cycle since the data reg 202_1 is storing valid data having the value Dat3. Thus, the valid vector 304 may have a value 0001. Since the pop signal 212 is de-asserted, the control circuit 208_1 may continue asserting the DV_1 signal, and the output data 216 may continue to show the last value Dat2 read from the FIFO. In this case, when the push signal 210 is asserted, the control circuit 208_2 may assert the DV_2 signal since the first (preceding) FIFO stage is storing valid data as indicated by the VALID_1 signal. The control circuit 208_2 may also assert the LOAD_2 signal to load the value Dat4 provided by the input multiplexer 206_2 as ID_2 to be stored in the data reg 202_2 since the VALID_2 signal is de-asserted in this cycle.

In a cycle I of the clk signal 302, the push signal 210 may be asserted again to store the input data 214 having a value Dat5 into the FIFO device 200. The VALID_1 signal may continue to be asserted in this cycle since the data reg 202_1 is storing valid data having the value Dat3, and the VALID_2 signal may be asserted in this cycle since the data reg 202_2 is also storing valid data having the value Dat4. Thus, the valid vector 304 shows a value 0011. In this case, when the push signal 210 is asserted, the control circuit 208_3 may assert the DV_3 signal since the VALID_3 signal is de-asserted, and the second (preceding) FIFO stage is storing valid data as indicated by the VALID_2 signal. The control circuit 208_3 may also assert the LOAD_3 signal to load the value Dat 5 provided by the input multiplexer 206_3 as ID_3 to be stored in the data reg 202_3 since the VALID_3 signal is de-asserted in this cycle.

Additionally, in the cycle I, since the pop signal 212 continues to stay de-asserted, the control circuit 208_1 may continue asserting the DV_1 signal, the control circuit 208_2 may continue asserting the DV_2 signal, and the output data 216 may continue to show the last value Dat2 read from the FIFO.

In a cycle J of the clk signal 302, the push signal 210 may be de-asserted. The VALID_3 signal may be asserted in this cycle, since the data reg 202_3 is storing valid data having the value Dat5. Additionally, the VALID_1 signal may continue to be asserted in this cycle since the data reg 202_1 is storing valid data having the value Dat3, and the VALID_2 signal may continue to be asserted in this cycle since the data reg 202_2 is also storing valid data having the value Dat4. Thus, the valid vector 304 may show a value 0111, as shown in FIG. 3.

In a cycle K of the clk signal 302, the push signal 210 and the pop signal 212 may stay de-asserted, therefore, there is no change in the valid vector 304 or the output data 216.

In a cycle L of the clk signal 302, the pop signal 212 may be asserted. The valid vector 304 may continue to include the value 0111 since the VALID_3, VALID_2, and VALID_1 signals are asserted. Thus, all the asserted bits in the valid vector 304 are stacked towards the right, closer to the first FIFO stage. Since the output of the data reg 202_1 is provided to the output data 216 upon receiving the pop signal 212, the output data 216 may include the value Dat3 stored in the data reg 202_1 for the first FIFO stage. However, since the pop signal 212 is asserted, the input multiplexer 206_1 may select the value Dat4 stored in the data reg 202_2 to provide as ID_1 to the data reg 202_1, and the input multiplexer 206_2 may select the value Dat5 stored in the data reg 202_3 to provide as ID_2 to the data reg 202_2.

Simultaneously, the control circuit 208_1 and the control circuit 208_2 may assert the LOAD_1 signal and the LOAD_2 signal to store the value Dat4 in the data reg 202_1 and the value Dat5 in the data reg 202_2, respectively. The control circuit 208_1 and the control circuit 208_2 may continue to assert the DV_1 signal and the DV_2 signal, respectively, since the data regs 202_1 and 202_2 are still storing valid data. However, control circuit 208_3 may de-assert the DV_3 signal since the data stored in the data reg 202_3 has moved to the preceding FIFO stage upon receiving the pop signal 212.

In a cycle M of the clk signal 302, the pop signal 212 may continue to be asserted. In this cycle, since the VALID_3 signal is de-asserted, the valid vector 304 may include the value 0011. Now the data reg 202_1 may include the value Dat4 and the data reg 202_2 may include the value Dat5. Since the output of the data reg 202_1 is provided to the output data 216 upon receiving the pop signal 212, the output data 216 may include the value Dat4 stored in the data reg 202_1 for the first FIFO stage. The input multiplexer 206_1 may provide the Dat5 stored in the data reg 202_2 as ID_1 to store in the data reg 202_1. Simultaneously, the control circuit 208_1 may assert the LOAD_1 signal to store ID_1 in the data reg 202_1. The control circuit 208_1 may continue to assert the DV_1 signal, since the data reg 202_1 is still storing valid data. However, the control circuit 208_2 may de-assert the DV_2 signal since the data stored in the data reg 202_2 has moved to the preceding FIFO stage upon receiving the pop signal 212.

In a cycle N of the clk signal 302, the pop signal 212 may continue to be asserted. In this cycle, since the VALID_2 signal is de-asserted, the valid vector 304 may show the value 0001. Now the data reg 202_1 may include the value Dat5, and the output data 216 may include the value Dat5 stored in the data reg 202_1. The control circuit 208_1 may de-assert the DV_1 signal upon receiving the pop signal 212, since there is no valid data stored in the subsequent FIFO stage to move to this FIFO stage, and the push signal 210 is de-asserted.

In a cycle O of the clk signal 302, the pop signal 212 may be de-asserted. Since the push signal 210 is also de-asserted, there is no new data to be stored in the FIFO device 200. The VALID_1 signal may be de-asserted in this cycle, and, therefore, the valid vector 304 may show the value 0000. Since the LSB of the valid vector 304 is "0", the FIFO empty signal 218 may be asserted based only on the VALID_1 signal being de-asserted indicating that the last FIFO entry is not storing any valid data.

Thus, as described with reference to FIGS. 2 and 3, the input data 214 is stored in a respective data register starting with the first FIFO stage and moving towards left (e.g., to a corresponding subsequent FIFO stage) upon receiving the push signal 210. Similarly, upon receiving the pop signal 212, the valid data stored in respective data registers of the FIFO stages moves towards right (e.g., to respective preceding stages) so that the output data 216 is always provided from the data reg 202_1 of the first FIFO stage. Therefore, a de-multiplexer at the input of the FIFO device to select between the data registers for writing the input data 214, and a multiplexer at the output of the FIFO device to select between the data registers for reading the FIFO device to provide the output data 216 are not needed, which can considerably reduce the gate depth count and simplify the design. Furthermore, having a bounded and small number of gate depth count for each FIFO stage can provide a faster path for the data flow through the FIFO device, which can improve the system performance.

FIG. 4 illustrates an example of a system 400 comprising a FIFO device 402 having a bounded gate count for each FIFO stage, in accordance with some embodiments. The FIFO device 402 may be an example of the FIFO device 200 described with reference to FIG. 2 and FIG. 3.

A source device 404 may be operable to send data to be stored in the FIFO device 402 when the FIFO device 402 is not full. For example, the FIFO device 402 may assert a full signal 416 that may get inverted to generate a ready signal to the source device 404 indicating that the FIFO device 402 is ready to receive the data from the source device 404. The full signal 416 may be generated using a MSB of a vector of valid signals corresponding to the FIFO stages (e.g., similar to the MSB of the valid vector 304). As described previously, the full signal 416 may be asserted, when the valid signal corresponding to the last FIFO stage is asserted indicating that the last FIFO stage and all the preceding FIFO stages are storing valid data. For example, the full signal 416 may be similar to the FIFO full signal 220. The source device 404, upon receiving the ready signal, may assert the push signal 408 to load input data 412 into the FIFO device 402, by asserting a valid signal indicating that the data sent by the source device 404 is valid.

A target device 406 may be operable to assert a pop signal 410 when ready to read output data 414 from the FIFO device 402 and the FIFO device 402 is not empty. For example, the FIFO device 402 may assert an empty signal 418 that may get inverted to generate a valid signal to the target device 406 indicating that the FIFO device 402 is sending valid output data 414. The empty signal 416 may be generated by inverting an LSB of a vector of valid signals corresponding to the first FIFO stage (e.g., similar to LSB of the valid vector 304). As described previously, the empty signal 418 may be asserted, when the valid signal corresponding to the first FIFO stage is not asserted (e.g., the first FIFO stage is not storing valid data). For example, the empty signal 418 may be similar to the FIFO empty signal 218. The target device 406 may receive the output data 414 from the FIFO device 402 if the valid signal is asserted indicating that the data read from the FIFO device 402 is valid.

Thus, the FIFO device 402 may include similar interfaces as the other general-purpose FIFOs (e.g., the FIFO device 100 described with reference to FIG. 1) to communicate with other entities of a computing device. However, the FIFO device 402 may include a bounded gate count per FIFO stage to allow the FIFO to scale to large FIFO depths. The input data 412 may be similar to the input data 214, the output data 414 may be similar to the output data 216, the push signal 408 may be similar to the push signal 210, and the pop signal 410 may be similar to the pop signal 212, with reference to the FIFO device 200.

FIG. 5 illustrates an example of a flow chart 500 for a method performed by a FIFO stage of a FIFO device, in accordance with some embodiments. As an example, the FIFO stage can be an intermediate FIFO stage of the FIFO device 400 or the FIFO device 402.

At step 502, the method may include receiving a push signal to store input data into a FIFO device comprising a plurality of FIFO stages coupled in series. Each of the FIFO stages includes a data register representing a FIFO entry, a valid register to store a data valid signal to provide a valid signal indicating whether the FIFO entry is storing valid data, and an input multiplexer to provide to a FIFO stage. The valid signals corresponding to the FIFO stages may represent a valid vector that includes asserted bits corresponding to the FIFO stages storing valid data stacked towards the output of the FIFO. As an example, the FIFO device 200 may receive the push signal 210 to store the input data 214 into the FIFO device 200 comprising 4 FIFO stages (e.g., N is 4). Referring back to FIG. 3, the FIFO device 200 may receive the push signal 210 in the cycle H of the clk signal 302 to store the value Dat4 of the input data 214. The valid vector may be an example of the valid vector 304 which can be used to generate the FIFO empty signal 218 and the FIFO full signal 220.

At step 504, the method may include upon receiving the push signal, determining by the FIFO stage of the FIFO device whether to update the data register of the FIFO stage based on respective valid signals from the FIFO stage, and neighboring FIFO stages of the FIFO stage. For example, the second FIFO stage of the FIFO device 200 may determine whether to update the data reg 202_2 of the second FIFO stage based on the VALID_2 signal from the second FIFO stage, the VALID_1 signal from the first FIFO stage, and the VALID_3 signal from the third FIFO stage. For example, upon receiving the push 210 signal, the second FIFO stage may update the data reg 202_2 with the value Dat4 of the input data 214 since the VALID_2 signal is de-asserted and the VALID_1 signal from the preceding first FIFO stage is asserted. The input multiplexer 206_2 may select the value Dat4 of the input data 214 as the intermediate data ID_2 to be stored in the data reg 202_2 since the VALID_3 signal is de-asserted.

At step 506, the method may include upon receiving a pop signal to provide output data from the FIFO device, determining by the FIFO stage whether to provide data stored in the data register of the FIFO stage to the preceding FIFO stage based on the valid signal from the FIFO stage. Referring back to FIG. 3, the FIFO device 200 may receive the pop signal 212 in the cycle L of the clk signal 302. The second FIFO stage may determine whether to provide the data stored in the data reg 202_2 to the first FIFO stage based on the VALID_2 signal. For example, in the cycle L of the clk signal 302, the input multiplexer 206_1 selects the data stored in the data reg 202_2 to provide as the intermediate data ID_1 to be stored in the data reg 202_1 of first FIFO stage since the VALID_2 signal is asserted. Furthermore, the second FIFO stage may update the data reg 202_2 with the value Dat5 stored in the data reg of the data reg 202_3 since the VALID_3 signal is asserted.

Figure 6:
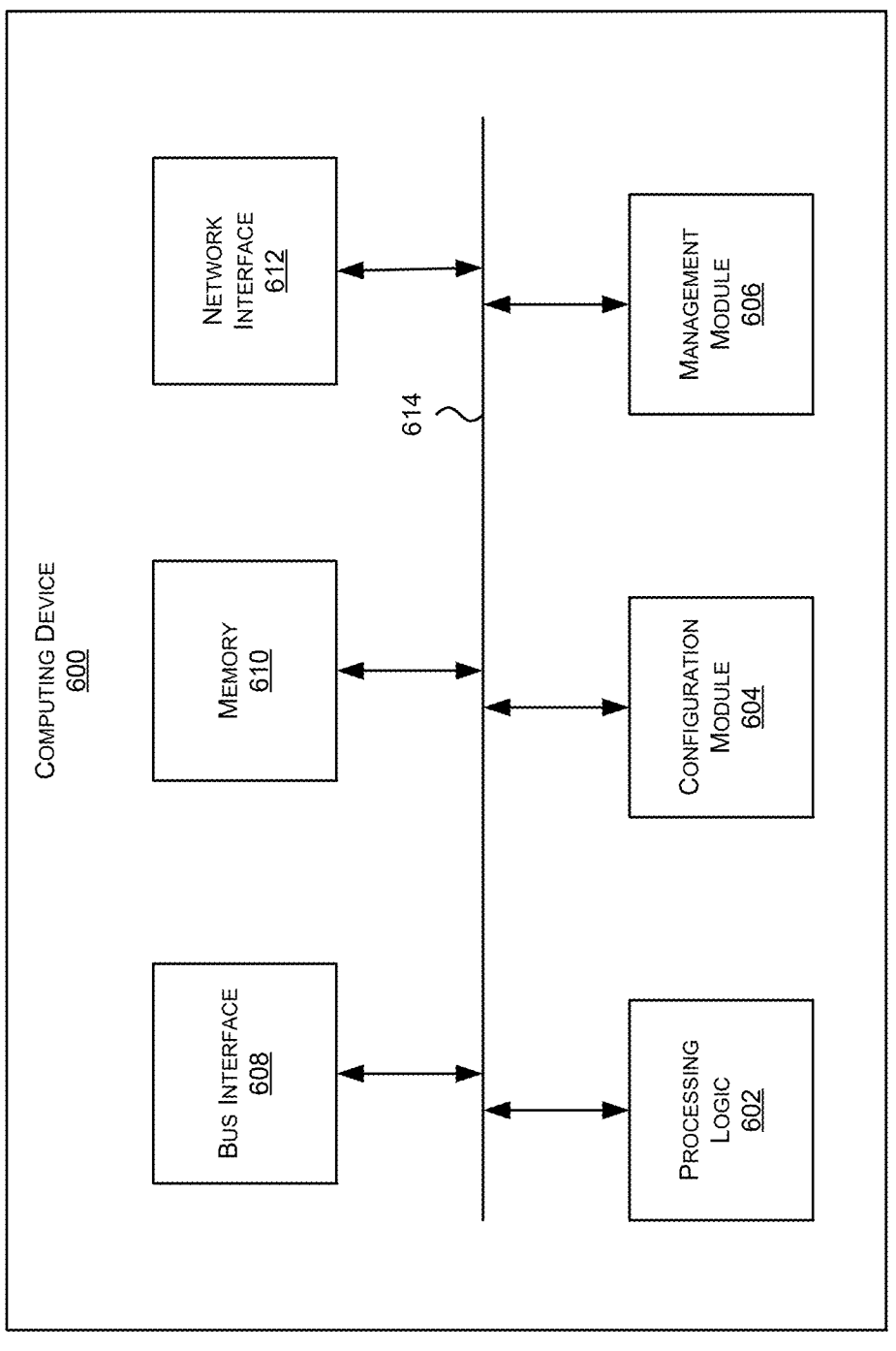
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. As an example, the computing device may include one or more instances of the FIFO device 200 or the FIFO device 402.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, which are not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel. In some embodiments, the processing logic 602 may include the source device 404, the network interface 612 may include the target device 406, and the FIFO device 402 may be part of the communication channel 614.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   a first-in-first-out (FIFO) device comprising:
      a plurality of FIFO stages coupled in series, wherein each of the FIFO stages includes:
         a data register representing a FIFO entry;
         a valid register operable to store a data valid signal to provide a valid signal indicating whether the data register of a corresponding FIFO stage is storing valid data; and
         a control circuit operable to generate the data valid signal for the corresponding FIFO stage, and a load signal to control data loading into the data register of the corresponding FIFO stage,
      wherein the control circuit of each intermediate FIFO stage having a preceding FIFO stage and a subsequent FIFO stage is operable to generate the load signal based on:
         valid signals of the intermediate FIFO stage, the preceding FIFO stage, and the subsequent FIFO stage;
         a push signal to load input data into the FIFO device; and
         a pop signal to provide output data from the FIFO device, and
      wherein the control circuit of each intermediate FIFO stage having the preceding FIFO stage and the subsequent FIFO stage is further operable to generate the data valid signal for the corresponding FIFO stage when:
         the push signal is asserted, and the valid signal of the preceding FIFO stage indicates that valid data is stored in the preceding FIFO stage, or
         the pop signal is asserted, and the valid signal of the subsequent FIFO stage indicates that valid data is stored in the subsequent FIFO stage;
      a source device operable to:
   send the input data to the FIFO device when the FIFO device is not full as indicated by a vector of valid signals corresponding to the FIFO stages; and
      assert the push signal to load the input data into the FIFO device; and
      a target device operable to:
      assert the pop signal when ready to read the output data from the FIFO device, and the FIFO device is not empty as indicated by the vector of valid signals corresponding to the FIFO stages; and receive the output data from the FIFO device.

2. The system of claim 1, wherein an asserted state of the valid signal of a last FIFO stage at an input of the FIFO device is used to indicate that the FIFO device is full.

3. The system of claim 1, wherein a de-asserted state of the valid signal of a first FIFO stage at an output of the FIFO device is used to indicate that the FIFO device is empty.

4. The system of claim 1, wherein the output data is read from a data register corresponding to a first FIFO stage having only a subsequent FIFO stage, but not a preceding FIFO stage.

5. A first-in-first-out (FIFO) device, comprising:

a plurality of FIFO stages coupled in series, wherein each of the FIFO stages includes:

a data register representing a FIFO entry;

a valid register operable to store a data valid signal to provide a valid signal indicating whether the data register of a corresponding FIFO stage is storing valid data; and a control circuit operable to generate the data valid signal for the corresponding FIFO stage, and a load signal to control data loading into the data register of the corresponding FIFO stage, wherein the control circuit of each intermediate FIFO stage having a preceding FIFO stage and a subsequent FIFO stage is operable to generate the load signal based on:

valid signals of the intermediate FIFO stage, the preceding FIFO stage, and the subsequent FIFO stage;

a push signal to load input data into the FIFO device; and a pop signal to provide output data from the FIFO device, and wherein the control circuit of each intermediate FIFO stage having the preceding FIFO stage and the subsequent FIFO stage is further operable to generate the data valid signal for the corresponding FIFO stage when:

the push signal is asserted, and the valid signal of the preceding FIFO stage indicates that valid data is stored in the preceding FIFO stage, or the pop signal is asserted, and the valid signal of the subsequent FIFO stage indicates that valid data is stored in the subsequent FIFO stage.

6. The FIFO device of claim 5, wherein each FIFO stage that has a subsequent FIFO stage includes:

an input multiplexer to select between the input data to the FIFO device and data stored in a data register of the subsequent FIFO stage to provide the data for loading into a data register of the FIFO stage.

7. The FIFO device of claim 6, wherein the input multiplexer selects the data stored in the data register of the subsequent FIFO stage to provide the data for loading into the data register of the FIFO stage when a valid signal of the subsequent FIFO stage indicates that the data register of the subsequent FIFO stage is storing valid data.

8. The FIFO device of claim 5, wherein the load signal of each FIFO stage is asserted to load the data into the FIFO stage when:

the valid signal of the FIFO stage indicates that the valid data is stored in the FIFO stage, the pop signal is asserted, and the push signal is asserted.

9. The FIFO device of claim 5, wherein the load signal of each FIFO stage that has a subsequent FIFO stage is asserted to load data into the FIFO stage when:

the valid signal of the subsequent FIFO stage indicates that valid data is stored in the subsequent FIFO stage, and the pop signal is asserted.

10. The FIFO device of claim 5, wherein the load signal of each FIFO stage that has a preceding FIFO stage is asserted to load data into the FIFO stage when:

the valid signal of the FIFO stage indicates no valid data is stored in the FIFO stage, the valid signal of the preceding FIFO stage indicates that valid data is stored in the preceding FIFO stage, the pop signal is not asserted, and the push signal is asserted.

11. The FIFO device of claim 5, wherein a control circuit of a first FIFO stage having only a subsequent FIFO stage is operable to generate a data valid signal for the first FIFO stage when:

the push signal is asserted, and a valid signal of the first FIFO stage indicates that no valid data is stored in the first FIFO stage, or a valid signal of the subsequent FIFO stage indicates that valid data is stored in the subsequent FIFO stage.

12. The FIFO device of claim 5, wherein a control circuit of a last FIFO stage having only a preceding FIFO stage is operable to generate a data valid signal for the last FIFO stage when:

the push signal is asserted, a valid signal of the last FIFO stage indicates that no valid data is stored in the last FIFO stage, and a valid signal of the preceding FIFO stage indicates that valid data is stored in the preceding FIFO stage.

13. The FIFO device of claim 5, wherein asserted valid bits of a valid vector formed by valid signals corresponding to the FIFO stages are stacked towards a first FIFO stage at an output of the FIFO device.

14. The FIFO device of claim 5, wherein an asserted state of the valid signal of a last FIFO stage at an input of the FIFO device is used to indicate that the FIFO device is full.

15. The FIFO device of claim 5, wherein a de-asserted state of the valid signal of a first FIFO stage at an output of the FIFO device is used to indicate that the FIFO device is empty.

16. A method, comprising:

receiving a push signal to store input data into a first-in-first-out (FIFO) device comprising a plurality of FIFO stages coupled in series, wherein each of the FIFO stages includes a data register representing a FIFO entry, a valid register to store a data valid signal to provide a valid signal indicating whether the FIFO entry is storing valid data, and an input multiplexer to provide to a FIFO stage;

upon receiving the push signal, determining by the FIFO stage of the FIFO device whether to update the data register of the FIFO stage based on respective valid signals from the FIFO stage, and neighboring FIFO stages of the FIFO stage; and upon receiving a pop signal to provide output data from the FIFO device, determining by the FIFO stage whether to provide data stored in the data register of the FIFO stage to the preceding FIFO stage based on the valid signal from the FIFO stage, wherein a control circuit of each intermediate FIFO stage having a preceding FIFO stage and a subsequent FIFO stage generates the data valid signal for the corresponding FIFO stage when:

the push signal is asserted, and the valid signal of the preceding FIFO stage indicates that valid data is stored in the preceding FIFO stage, or the pop signal is asserted, and the valid signal of the subsequent FIFO stage indicates that valid data is stored in the subsequent FIFO stage.

17. The method of claim 16, wherein, upon receiving the pop signal, the input multiplexer of the FIFO stage selects the data stored in the data register of the subsequent FIFO stage to provide to the FIFO stage if the valid signal from the subsequent FIFO stage is asserted.

18. The method of claim 16, further comprising using the valid signal of a last FIFO stage at an input of the FIFO device as a FIFO full signal.

19. The method of claim 16, further comprising inverting the valid signal of a first FIFO stage at an output of the FIFO device as a FIFO empty signal.

* * * * *